3,117,898
SOLID PROPELLANT CONTAINING LITHIUM PERCHLORATE

Ross M. Hedrick and Edward H. Mottus, Dayton, Ohio, and Lucius Gilman, Wakefield, Mass., assignors to Monsanto Chemical Company, St. Louis, Mo., a corporation of Delaware
No Drawing. Filed Oct. 30, 1958, Ser. No. 770,744
12 Claims. (Cl. 149—19)

This invention relates to novel compositions of matter which are useful as solid rocket propellants, pyrotechnics, and the like, and to the process of preparing same. More specifically this invention relates to compositions of matter comprising a polyurethane and lithium perchlorate and to the method of dissolving the lithium perchlorate in the polyol monomer of the polyurethane prior to polymerization.

Liquid compositions as the fuel-oxidant mixture for rockets present serious problems. The use of liquid propellants require considerable plumbing, valves, metering pumps and intricate controls to provide the means for effecting delivery of the fuel and oxidant to the combustion chamber in the proper ratio. The liquids employed are extremely corrosive and are also subject to loss. Therefore, rockets employing liquid propellant compositions are not reliable for long standing in ready-to-go-condition. Furthermore, handling the corrosive liquids is a hazardous, time-consuming and cumbersome job, which precludes their use in tactical weapon systems in the field and aboard ships.

In contradistinction thereto the solid propellant motor is inherently very simple since the ratio and distribution of fuel, oxidant and additives are fixed when the solid propellant is prepared. Thus the solid propellant system requires no plumbing, valves, or controls and contains no mechanical moving parts which can go wrong. The solid propellant rocket also generally is characterized by relatively long storage life, ease in handling and high reliability, such that it is in constant readiness for instant use, whereby it is well adapted for tactical and strategic weapon systems in field use and aboard ships. A further advantage of the solid propellant rocket is that the relatively rigid propellant charge aids in the support of the chamber during handling and when in use such that a lighter-weight case can be employed, which saving in weight plus the elimination of much hardware required for a liquid propellant system provides a bigger pay-load.

Conventional composite solid propellant compositions generally consist of an inorganic oxidant and a plastic binder, which also serves as the reductant-fuel of the system. The aforesaid system is a heterogeneous composition wherein the burning rate and stability to detonation are dependent to some extent upon the particle size of the oxidant. Both of these properties are improved as the particle size of the oxidant is reduced, but milling to provide a finely divided oxidant is hazardous and periodic explosions are encountered.

The principal object of this invention is to provide an improved solid propellant composition. Another object of this invention is to provide an improved process for casting solid propellant compositions in rocket cases. Still another object of this invention is to provide a novel solid propellant composition having a high specific impulse. A further object of this invention is to provide a novel solid propellant composition which has a substantial amount of the oxidant present as a solid solution. A still further object of this invention is to provide a novel solid composition which is useful in pyrotechnic displays. Other objects and advantages of this invention will be apparent to those skilled in the art from the following disclosure.

It has now been found that various polyhydroxy compounds are good solvents for lithium perchlorate which polyhydroxy compounds provide an effective means to carry large quantities of lithium perchlorate into a polymer system when polymerized with a difunctional compound such as a diisocyanate to produce a polyurethane, whereby the lithium perchlorate is not subject to milling hazards. It is preferred that the polyhydroxy compounds be polyfunctional primary alcohols, but secondary and tertiary alcohols have also been found to be suitable.

Illustrative examples of suitable aliphatic alcohols are ethylene glycol, trimethyene glycol, tetramethylene glycol, pentamethylene glycol, hexamethylene glycol, heptamethylene glycol, octamethylene glycol, nonamethylene glycol, decamethylene glycol, dodecamethylene glycol, neopentyl glycol, glycerol, pentaerythritol, 2,5-hexanediol, and the like which preferably contain up to about 12 carbon atoms. Also the polyether glycols such as the polyethylene glycols, polypropylene glycols and polybutylene glycols have been found to be suitable solvents for the lithium perchlorate. The lower members of the series are generally preferred, but polyether glycols having a molecular weight of up to about 9000 have been found to be suitable. Other particularly suitable polyhydroxy compounds are di- and tri-alkanolamines such as diethanolamine and triethanolamine and the like, which preferably contain up to about 21 carbon atoms.

Illustrative examples of suitable diisocyanates are tetramethylene diisocyanate, pentamethylene diisocyanate, hexamethylene diisocyanate, octamethylene diisocyanate, dodecamethylene diisocyanate, m-phenylene diisocyanate, tolylene-2,4-diisocyanate, tolylene-2,6-diisocyanate, 3,3'-bitolylene-4,4'-diisocyanate, naphthalene-1,5-diisocyanate, diphenylmethane-4,4'-diisocyanate, and the like. It is preferable that the alkyl and/or aryl diisocyanate contain less than about 20 carbon atoms, such that the polyhydric moiety of the polyurethane need not be required to carry excessive quantities of the lithium perchlorate, which may exceed the solubility of the lithium perchlorate in the polyol at the desired temperatures.

The polymerization of the particular polyhydric compound and diisocyanate is effected by preferably employing a slight molar excess of the diisocyanate sufficient to react with all of the hydroxyl groups, i.e., about 1.05 mole equivalents of diisocyanate are employed per mole of a dihydric compound. The polymerization of the aforesaid reactants to provide the polyurethane can be accelerated by the application of heat, but in general the system should not be held at temperatures in excess of about 200° C. to preclude the dissociation of the polyurethane and the possible hazard of effecting an explosive oxidation of the system. Normally polymerization temperatures below about 150° C. will be sufficient for most reactants selected. The polymerization can also be favored by the presence of a base catalyst, as for example a tertiary amine such as triethylamine, N,N-diethylcyclohexylamine, N - methyl morpholine, pyridine, and other base catalysts.

To provide a dense substantially homogeneous polymer composition it is necessary to preclude the presence of agents in the polymerization system which would cause foam formation therein. Accordingly, the system should be maintained free from water. Also proper mixing means should be employed to preclude trapping air in the final polymer composition.

The quantity of lithium perchlorate desired in the final solid propellant composition will vary depending on the particular selection of reactants, but will generally vary from about 70 to about 80 weight percent of lithium perchlorate, based on the total weight of the composition. The preferred amount for any given polyurethane can be readily calculated to provide sufficient oxidant to consume substantially all of the polyurethane, which functions as binder and fuel. It will be understood that substantially smaller amounts of the lithium perchlorate can be employed in compositions for pyrotechnic display use, wherein amounts of from about 40 to about 80 weight percent are suitable.

The polyurethane compositions are relatively strongly adhesive materials and when the compositions are polymerization cast directly in a rocket motor it is desirable that the core insert, employed to provide the desired internal cavity to effect proper radial burning of the propellant composition, be fabricated from, or coated with polyethylene or polytetrafluoroethylene in order to provide ready release of the core insert when polymerization is terminated.

When the solid propellant is produced by extrusion for insertion in small-bore rocket cases a small amount of the catalyzed liquid polymer composition can first be added to the cylinder case such that the insertion of the extruded mass will displace the liquid polymer forcing it to rise in the annular space between the extrusion mass and the cylinder wall whereby the inserted mass is securely bonded within the case. The liquid polymer can be of similar composition to the propellant composition insert or any other suitable polymer composition which can be readily cured at temperatures below about 200° C., as for example epoxy resins, polysulfide rubbers and the like.

Also the novel lithium perchlorate-polyurethane compositions of this invention can contain various other components finely dispersed therein such as the finely divided light metals and various hydrides thereof, e.g., beryllium, boron, magnesium, aluminum, magnesium hydride, aluminum hydride, the various solid hydrides of boron such as decaborane, alkylated decaboranes (ethyl alkylated decaborane), aluminum borohydride, and the like. For example, the composite system lithium perchlorate-polyurethane may preferably contain up to about 20 percent by weight of the total composition of atomized aluminum (particle size about 20 microns). Preferably the aforesaid materials should be sufficiently fine to all pass a standard 100-mesh screen, and more preferably should pass a 200-mesh screen.

These light metal and metal hydride high-energy additives should preferably not exceed about 25 weight percent of the total composition. Notwithstanding the relatively high-energy content per unit of weight of the aforesaid additives, the heavy combustion exhaust tends to lower the performance of the solid propellant composition such that it is often desirable to incorporate not more than from 5 to about 10 weight percent of said additive, based on the total weight of the propellant composition.

The lithium perchlorate-polyurethane compositions of this invention burn vigorously and relatively uniformly when ignited and are useful as a solid propellant for rockets including short-ranged ballistic weapons, such as aircraft and artillery rockets, and long-range strategic missiles, wherein they may be the sole propellant or be employed in one or more stages of a multistage rocket system. The aforesaid compositions are also useful for rocket assisted takeoff, as boosters and sustainers, and as pyrotechnics. When confined the aforesaid compositions also are particularly valuable as explosives.

The following examples are illustrative of this invention:

*Example 1*

A mixture of 15 parts by weight of "Teracol" 30, a polybutylene ether, and 35 parts by weight of lithium perchlorate was heated to about 160° to 170° C. to effect solution thereof. Some very fine crystals came out of solution at about 100° C. and were redissolved at 150° C. Then 2 parts by weight of tolylene 2,4-diisocyanate was added thereto and mixed with the solution in the presence of a catalytic amount of pyridine. The polymer composition was placed in a long mold to give a long strip which burned very vigorously when ignited with a flame.

*Example 2*

A mixture of 15 parts by weight of "Carbowax" 4000, a polyethylene glycol, and 35 parts by weight of lithium perchlorate was heated to about 190° C. to obtain a solution. Then the temperature was allowed to drop to about 170° C. and 5 parts by weight of tolylene-2,4-diisocyanate added thereto. The composition was observed to thicken and the reaction vessel was then removed from the oil bath and a catalytic amount of pyridine added thereto. After about three minutes at 150° C. the reaction mixture was a solid polymer composition. A portion of this composition was ignited and observed to burn vigorously and smoothly.

*Example 3*

A mixture of 15 parts by weight of Polyglycol E 4000, a polyethylene glycol, and 35 parts by weight of lithium perchlorate was heated at 200° C. to effect solution of the perchlorate therein. Then 5 parts by weight of tolylene-2,4-diisocyanate was added thereto at a temperature of about 190° C. and the viscosity of the reaction mixture was observed to increase at once. The reaction vessel was removed from the oil bath and a catalytic amount of pyridine was added thereto and mixed therein. The vessel was returned to the oil bath at about 180° C. and the viscosity of the composition observed to rapidly increase over a three-minute period. Then the reaction mass was allowed to cool to room temperature to obtain a rubbery composition which became more rigid after further standing. The polymer composition appeared homogeneous and a sample thereof was ignited and observed to burn very vigorously.

*Example 4*

A mixture of 15 parts by weight of diethylene glycol and 70 parts by weight of lithium perchlorate was heated to about 200° C. to effect solution thereof. At about 160° C., 20 parts by weight of tolylene-2,4-diisocyanate was added thereto, then the reaction mass was cooled to about 100° C. with no visible change in structure. A catalytic amount of pyridine was added thereto and thereafter held for about 5 minutes at about 140° C. and then allowed to cool to room temperature. A sample of the reaction mass was ignited and observed to burn rapidly and smoothly.

*Example 5*

A mixture of 12 parts by weight ethylene glycol, 120 parts by weight lithium perchlorate and 37 parts by weight of tolylene-2,4-diisocyanate was heated to about 160 to 170° C. and a catalytic amount of pyridine added thereto. Then the reaction mixture was held at this temperature for about 30 minutes, after which it was allowed to cool to obtain a hard composition which burned vigorously and smoothly when ignited.

*Example 6*

A mixture of 42 parts by weight of a polyethylene glycol (4000) and 124 parts by weight of lithium perchlorate were heated together at about 225° C. to effect solution thereof. Then 2 parts by weight of tolylene-2,4-diisocyanate was added thereto and the reaction mixture observed to thicken immediately. The reaction mixture was cooled to 180° C., lithium perchlorate remaining in solution, and held thereat for 30 minutes, then allowed to cool to room temperature. A portion of the hard composition was ignited and burned rapidly and smoothly.

*Example 7*

A mixture of 10 parts by weight of N-oleoyldiethanolamine and 22.5 parts by weight of lithium perchlorate was heated to 140° C. to effect solution of the perchlorate. Then the mixture was cooled to 90° C. and 4 parts by weight of tolylene-2,4-diisocyanate added thereto. The reaction mixture was held at 90° C. for about 30 minutes and then cooled to room temperature. A portion of the solid polymer composition was ignited and burned well.

Another polyalkanolamine which was particularly useful for effecting the solution of the lithium perchlorate was monohydroxyethyltrihydroxypropylethylenediamine.

*Example 8*

A mixture of 2.5 parts by weight of diethanolamine and 7.5 parts by weight of lithium perchlorate was heated to 125° C. to effect complete solution. Then an additional 11 parts by weight of lithium perchlorate was added thereto and the temperature held at about 150 to 155° C. for 15 minutes to effect complete solution of the lithium perchlorate. Then 4 parts by weight of tolylene-2,4-diisocyanate was added thereto and the reaction mixture maintained at about 150° C. for about 15 minutes, then allowed to cool to room temperature. A portion of the composition was ignited and burned smoothly.

We claim:

1. A composition of matter consisting essentially of a substantially homogeneous mixture of lithium perchlorate and a polyurethane prepared from a diisocyanate and a polyhydroxy compound selected from the group consisting of aliphatic polyhydric alcohols, polyether glycols, polyalkanolamines, and mixtures thereof, wherein the lithium perchlorate is present in the relative proportions of from 4 to 8 parts by weight thereof to from 6 to 2 parts by weight of polyurethane and said lithium perchlorate is essentially contained therein as a solid solution.

2. The composition of matter of claim 1, wherein the polyhydroxy compound is an aliphatic polyhydric alcohol and the lithium perchlorate is present in an amount of from about 40 to about 80 weight percent of the total composition.

3. The composition of matter of claim 1, wherein the polyhydroxy compound is a polyether glycol and the lithium perchlorate is present in an amount of from about 40 to about 80 weight percent of the total composition.

4. The composition of matter of claim 1, wherein the polyhydroxy compound is a polyalkanolamine and the lithium perchlorate is present in an amount of from about 40 to about 80 weight percent of the total composition.

5. The process of preparing substantially homogeneous mixtures of lithium perchlorate and a polyurethane comprising dissolving lithium perchlorate in a polyhydroxy compound selected from the group consisting of aliphatic polyhydric alcohols, polyether glycols, polyalkanolamines, and mixtures thereof at a temperature of from about room temperature up to about 200° C. and polymerizing the polyhydroxy compound with a diisocyanate.

6. The process of preparing substantially homogeneous mixtures of lithium perchlorate and a polyurethane comprising dissolving lithium perchlorate in an aliphatic polyhydric alcohol at a temperature of from about room temperature up to about 200° C. and polymerizing the said alcohol with a diisocyanate.

7. The process of preparing substantially homogeneous mixtures of lithium perchlorate and a polyurethane comprising dissolving lithium perchlorate in a polyether glycol at a temperature of from about room temperature up to about 200° C. and polymerizing the said alcohol with a diisocyanate.

8. The process of preparing substantially homogeneous mixtures of lithium perchlorate and a polyurethane comprising dissolving lithium perchlorate in a polyalkanolamine at a temperature of from about room temperature up to about 200° C. and polymerizing the said alcohol with a diisocyanate.

9. A composition of matter consisting essentially of a substantially homogeneous mixture of lithium perchlorate and a polymeric composition characterized by a plurality of urethane linkages,

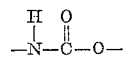

and the lithium perchlorate is present in an amount of from about 40 to about 80 weight percent of the total composition and is essentially contained therein as a solid solution.

10. The process of claim 5 wherein the lithium perchlorate is dissolved in the polyhydroxy compound at a temperature of from about 90° C. up to about 200° C.

11. The composition of matter of claim 1 having uniformly dispersed therein up to about 25 percent, by weight of the total composition, of a finely divided high energy additive selected from the group consisting of beryllium, boron, magnesium, aluminum, magnesium hydride, aluminum hydride, aluminum borohydride, decaborane, alkylated decaboranes and mixtures thereof.

12. The composition of matter of claim 11, wherein the finely divided high energy additive is present in an amount of from about 5 to about 10 weight percent of the total composition.

References Cited in the file of this patent

UNITED STATES PATENTS

| | | |
|---|---|---|
| 2,479,828 | Geckler | Aug. 23, 1949 |
| 2,783,138 | Parsons | Feb. 26, 1957 |
| 2,855,372 | Jenkins et al. | Oct. 7, 1958 |
| 2,857,258 | Thomas | Oct. 21, 1958 |
| 2,926,613 | Fox | Mar. 1, 1960 |
| 2,988,876 | Walden | June 20, 1961 |
| 2,990,683 | Walden | July 4, 1961 |

OTHER REFERENCES

Zaehringer: Chem. Engineering Progress, vol. 51, No. 7, July 1955, p. 302.

Zaehringer: "Modern Plastics," vol. 34, October 1956, pp. 148–151 (note p. 149).

"Missiles and Rockets," vol. 2, No. 8, August 1957, pp. 67–73 (note p. 71).

Ritchey: Chem. and Eng. News, November 11, 1957, pp. 78–82.

Chem. and Eng. News, January 6, 1958, pp. 79–81.

Noland: Chemical Engineering, May 19, 1958, p. 155.

Zaehringer: Missiles and Rockets, vol. 4, No. 6, August 11, 1958, pp. 28–37.

Zaehringer: "Solid Propellant Rockets, Second State," American Rocket Co., Box 1112, Wyandotte, Michigan, September 1958, pp. 62-3 and 2-9-215.